(12) United States Patent
Mori et al.

(10) Patent No.: US 6,870,595 B1
(45) Date of Patent: Mar. 22, 2005

(54) OPTICAL FILTER DEVICE AND METHOD OF MAKING SAME

(75) Inventors: Toshiharu Mori, Izumiotsu (JP); Takuji Hatano, Suita (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/392,264

(22) Filed: Sep. 9, 1999

Related U.S. Application Data

(60) Provisional application No. 60/126,181, filed on Mar. 25, 1999.

(30) Foreign Application Priority Data

Sep. 22, 1998 (JP) .......................................... 10-268112

(51) Int. Cl.$^7$ ................................................. G02F 1/13
(52) U.S. Cl. ...................................... 349/197; 349/187
(58) Field of Search ................................ 349/187, 197, 349/194, 98, 114, 176; 385/16, 32, 130, 25, 31

(56) References Cited

U.S. PATENT DOCUMENTS

| | | | | |
|---|---|---|---|---|
| 3,909,113 A | * | 9/1975 | Stotts ........................... 349/193 |
| 3,963,310 A | * | 6/1976 | Giallorenzi et al. ......... 349/196 |
| 4,246,302 A | * | 1/1981 | Benton et al. .............. 428/1.25 |
| 5,042,889 A | * | 8/1991 | Benzoni ........................ 385/16 |
| 5,061,046 A | * | 10/1991 | Lee et al. .................... 349/193 |
| 5,214,725 A | | 5/1993 | Yanagawa et al. |
| 5,309,534 A | | 5/1994 | Cohen et al. |
| 5,316,806 A | * | 5/1994 | Yoshinaga et al. .............. 428/1 |
| 5,399,390 A | * | 3/1995 | Akins ......................... 428/1.62 |
| 5,437,811 A | | 8/1995 | Doane et al. |
| 5,457,760 A | | 10/1995 | Mizrahi |
| 5,459,591 A | * | 10/1995 | Faris ............................. 349/1 |
| 5,479,547 A | * | 12/1995 | Kunikane et al. .............. 385/47 |
| 5,562,838 A | * | 10/1996 | Wojnarowski et al. ........ 216/24 |
| 5,889,900 A | * | 3/1999 | Hallemeier .................... 385/11 |
| 5,937,115 A | * | 8/1999 | Domash ........................ 385/16 |
| 5,940,548 A | * | 8/1999 | Yamada et al. ............... 385/14 |
| 5,978,065 A | * | 11/1999 | Kawasumi et al. .......... 349/188 |
| 6,008,927 A | * | 12/1999 | Minemoto et al. .......... 359/245 |
| 6,011,609 A | * | 1/2000 | Kato et al. ................... 349/190 |
| 6,043,861 A | * | 3/2000 | Davis .......................... 349/193 |
| 6,055,035 A | * | 4/2000 | von Gutfeld et al. ....... 349/187 |
| 6,106,743 A | * | 8/2000 | Fan ............................. 252/582 |
| 6,270,261 B1 | * | 8/2001 | Kawano ....................... 385/88 |
| 6,311,884 B1 | * | 11/2001 | Johnson ...................... 349/156 |

FOREIGN PATENT DOCUMENTS

| | | | | |
|---|---|---|---|---|
| EP | 608566 A2 | * | 8/1994 | ............ G02B/6/30 |
| JP | 04069604 A | * | 3/1992 | ............ G02B/6/00 |
| JP | 05249506 A | * | 9/1993 | ............ G02F/1/31 |
| JP | 09021912 A | * | 1/1997 | ............ G02B/5/28 |
| JP | 10104472 A | * | 4/1998 | ............ G02B/6/42 |
| JP | 10246825 A | * | 9/1998 | ............ G02B/6/12 |
| JP | 10282324 | | * 10/1998 | |
| JP | 10-319261 | | 12/1998 | |
| JP | 11038240 A | * | 2/1999 | ............ G02B/6/12 |
| JP | 11-068705 | | 3/1999 | |

OTHER PUBLICATIONS

IBM technical disclosure NN86045000, Apr. 1, 1986.*

* cited by examiner

Primary Examiner—Kenneth Parker
(74) Attorney, Agent, or Firm—Burns, Doane, Swecker & Mathis, L.L.P.

(57) ABSTRACT

The optical waveguide includes an optical waveguide layer, and a filter element including an ultraviolet curing liquid crystal layer disposed in a position which divides the optical waveguide layer in a waveguide direction. The ultraviolet curing liquid crystal layer having a twisted structure in which a helical pitch after curing reflects light of a predetermined wavelength.

3 Claims, 3 Drawing Sheets

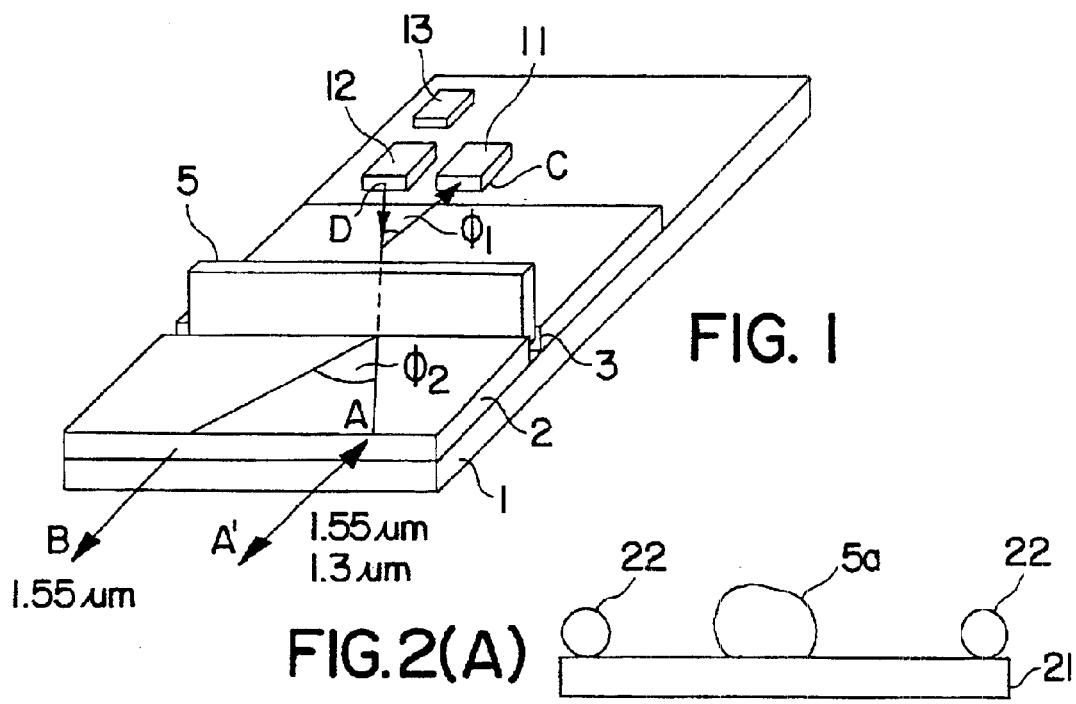
FIG. 1
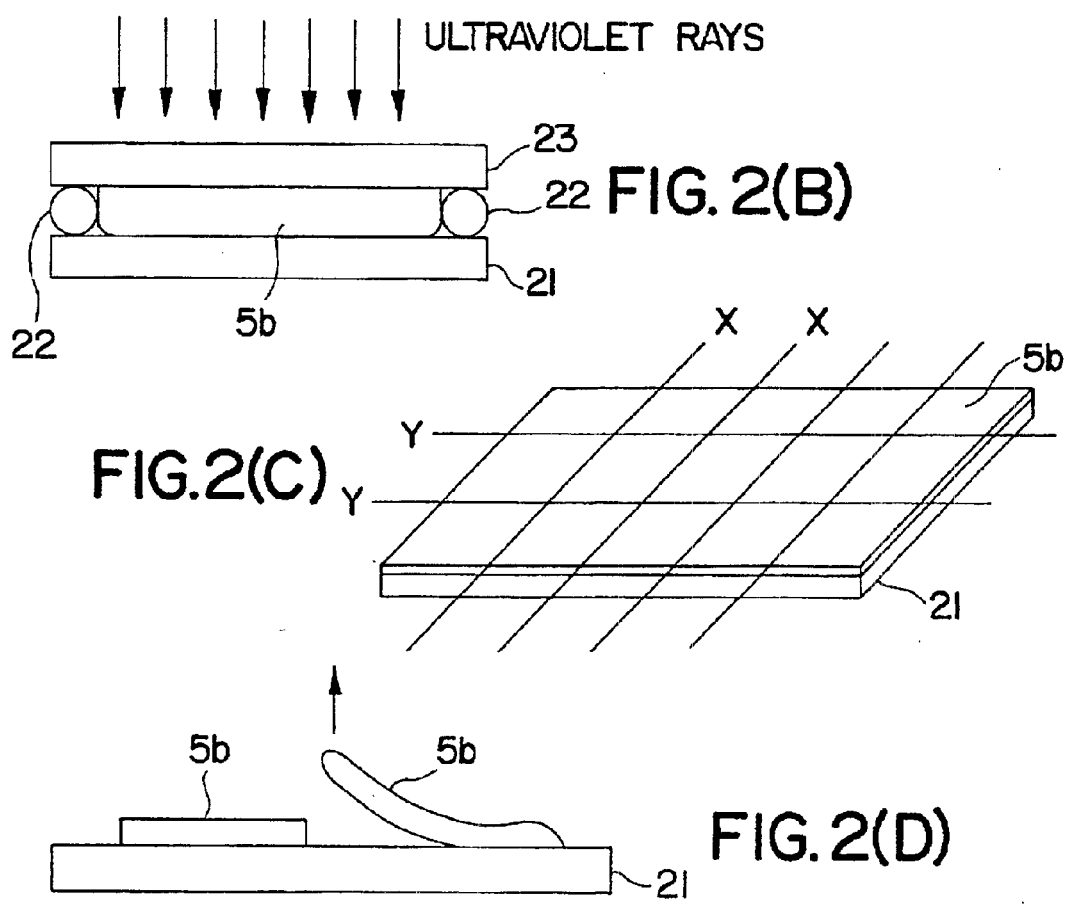
FIG. 2(A)
FIG. 2(B)
FIG. 2(C)
FIG. 2(D)

OPTICAL FILTER DEVICE AND METHOD OF MAKING SAME

Priority is claimed to Japanese Patent Application No. 10-268112 filed in Japan on Sep. 22, 1998, and to U.S. Provisional Patent Application 60/126,181 filed in the United States on Mar. 25, 1999, both of which are herein incorporated by reference.

BACKGROUND OF THE INVENTION

1) Field of the Invention

The present invention relates to an optical filter device, and particularly to an optical filter device for splitting light which is to be used in a wavelength division multiplexing communication apparatus.

2) Discussion of Related Art

Recently, in order to realize information transmission of high speed and high density, wavelength division multiplexing communication in which light signals of different wavelengths are transmitted through a single optical fiber has been studied and developed. For a system for transmitting an image and a sound from a broadcasting station to a subscriber, particularly, a transmission procedure is under study in which a video signal is transmitted by light having a wavelength of 1.55 $\mu$m and an audio signal by light having a wavelength of 1.3 $\mu$m, in order to reduce the production cost of a line facility. In a wavelength division multiplexing light transmission module which is used in such a system, light must be split into two light components of different wavelengths. Conventionally, a dielectric multilayer film filter is therefore inserted into an optical waveguide layer.

Specifically, a groove of several tens of micrometers is formed in an optical waveguide layer, and such a filter is inserted into the groove. When the groove is narrowed, the insertion loss can be reduced. Therefore, the filter must also be formed so as to have a reduced thickness.

In the prior art, a dielectric film consisting of several tens of layers is grown on a polyimide film by the vacuum evaporation method. However, a process of forming a multilayer film by the vacuum evaporation method has a low mass productivity and hence there is a problem in that the production cost is very high.

OBJECTS AND SUMMARY OF THE INVENTION

It is an object of the invention to provide an optical filter device having a filter element which can be economically mass-produced.

In order to attain this object, in the optical filter device of the invention, a filter element having a liquid crystal layer is disposed in a position which divides an optical waveguide layer in a waveguide direction, the liquid crystal layer having a twisted structure in which a helical pitch is adjusted so as to reflect light of a predetermined wavelength.

Some kinds of liquid crystals such as a liquid crystal exhibiting a cholesteric phase have a property that molecules are in a twisted state, so as to reflect light of a specific wavelength corresponding to the helical pitch and transmit light of another wavelength. The invention employs this property of a liquid crystal, and uses a liquid crystal layer as a wavelength filter.

Various kinds of cholesteric liquid crystals can be used for content of the liquid crystal layer. For example, chiral nematic liquid crystal which contains nematic liquid crystal and chiral agent can be used. By controlling added amount of the chiral agent, the helical pitch or chiral pitch can be easily adjusted. Therefore, chiral nematic liquid crystal is preferable for the present invention. Further to this, ultraviolet curing liquid crystal can be also used for the liquid crystal layer. In this liquid crystal, the helical pitch does not change regardless of the temperature change. Therefore, temperature management is not necessary when using this type of liquid crystal.

A liquid crystal layer of this kind can be economically formed into a device element by a simple production step of sandwiching the liquid crystal layer between transparent substrates such as glass plates and, if the liquid crystal is UV curing liquid crystal material, then irradiating the layer with ultraviolet rays. Consequently, an optical filter device can be configured by inserting such a filter element into a groove which is formed in an optical waveguide layer. Alternatively, a liquid crystal material may be filled into a groove which is formed in an optical waveguide layer, and, if the liquid crystal is UV curing liquid crystal material, then cured. A liquid crystal layer of a thickness of about 10 $\mu$m can be easily obtained, and hence the insertion loss is low.

Usually, light is circularly polarized. When the liquid crystal layer is configured by a two- or four-layer structure consisting of right- and left-handed twist layers, the reflectance to light of a predetermined wavelength can be enhanced.

BRIEF DESCRIPTION OF THE DRAWINGS

The present invention will now be described by way of exemplary embodiments, to which the invention is not limited, as shown in the accompanying drawings in which:

FIG. 1 is a perspective view showing an optical filter device which is a first embodiment of the invention;

FIGS. 2(A)–2(D) are views illustrating a process of producing a filter element configured by a liquid crystal layer;

DETAILED DESCRIPTION OF THE PREFERRED EMBODIMENTS

Figure 3:
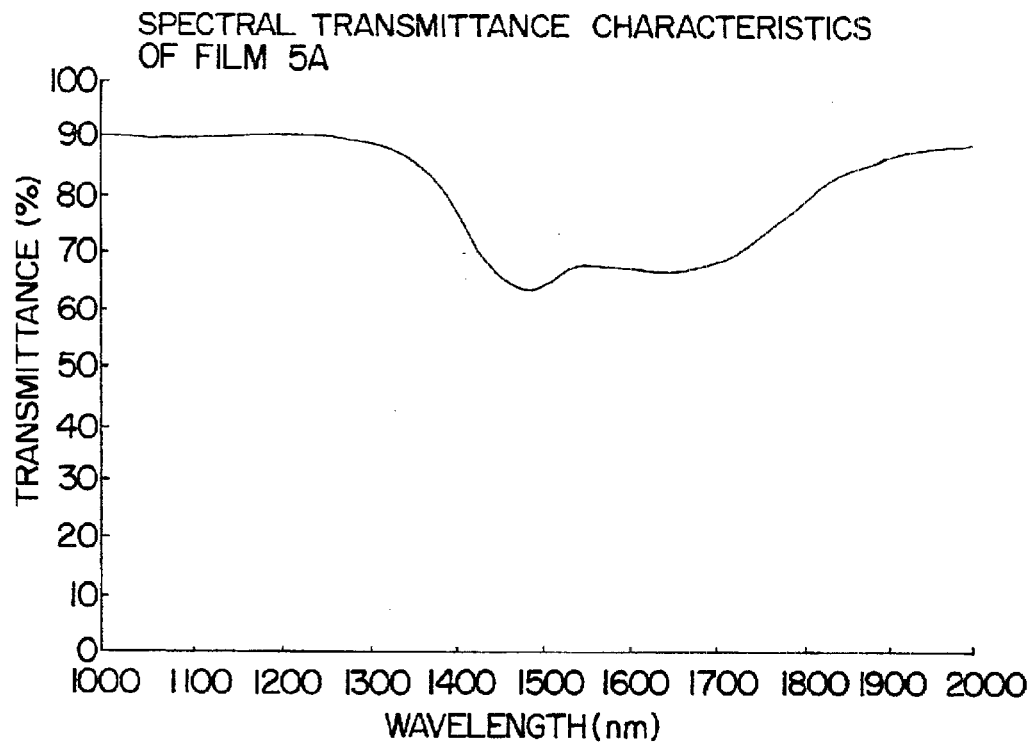
FIG. 3 is a graph showing the spectral transmittance characteristic of the filter element (single-layer)

Hereinafter, embodiments of the optical filter device of the invention will be described with reference to the accompanying drawings.

Properties of a Liquid Crystal Layer as a Wavelength Filter

As a method of selectively reflecting light of a predetermined wavelength and transmitting light of another wavelength, usually, an interference effect of a thin film is employed. A liquid crystal exhibiting a cholesteric phase, particularly, a chiral nematic liquid crystal configured by adding a chiral agent to a nematic liquid crystal, has such a reflection characteristic. A liquid crystal of this kind selectively reflects light of a wavelength corresponding to the helical pitch of liquid crystal molecules as shown in expressions (1) and (2) below (circular dichroism).

$$\lambda = n \cdot P \quad (1)$$

$$\Delta\lambda = \Delta n \cdot P \quad (2)$$

λ: selective reflection wavelength
P: helical pitch
n: average refractive index
Δλ: band of selective reflection
Δn: $n_e - n_o$ ($n_e$ is the refractive index of the extraordinary ray, and $n_o$ is the refractive index of the ordinary ray).

First Embodiment

FIG. 1 shows an optical filter device of a first embodiment, and FIG. 2 shows a process of producing a liquid crystal layer which is used in the device.

In the optical filter device shown in FIG. 1, an optical waveguide layer 2 made of quartz is stacked on a silicon substrate 1, and a filter element 5 which will be described later in detail is inserted into a groove 3 which is formed in a center portion of the optical waveguide layer 2. A photodiode 11, a laser diode 12, and a monitor photodiode 13 are further mounted on the silicon substrate 1.

A video signal of a wavelength of 1.55 μm and an audio signal of a wavelength of 1.3 μm are superimposed and input from the direction of the arrow A to the optical waveguide layer 2. The video signal is selectively reflected by the filter element 5 to be emitted in the direction of the arrow B. The audio signal is transmitted through the filter element 5 and then impinges on the photodiode 11 in the direction of the arrow C. On the other hand, an audio signal of a wavelength of 1.3 μm is supplied from the laser diode 12 from the direction of the arrow D, and then transmitted through the filter element 5 in the direction of the arrow D, and then transmitted through the filter element 5 in the opposite direction, to be emitted in the direction of the arrow A'. The separation of the paths according to wavelength is because $\phi_2$ (signifying the angle at which the video signal input from the direction of the arrow A is reflected by the filter element 5 to be emitted in the direction of the arrow B is relatively large. It is large enough that the 1.3 μm wavelength light coming from the laser diode 12 goes in the direction of arrow A' and not toward arrow B. While, because $\phi_1$ of FIG. 1 is relatively small, the audio signal input from the direction of the arrow A and transmitted through the filter element 5 can go not only to the laser diode 12 but also to the photodiode 11.

The filter element 5 is a single-layer member consisting of a film-like ultraviolet curing liquid crystal layer having a twisted structure in which a helical pitch after curing is adjusted so as to reflect light of a wavelength of 1.55 μm, or a stacked member of such a liquid crystal layer and a transparent substrate. Hereinafter, a production process will be described specifically.

As shown in FIG. 2(A), a stripping agent is first applied to a mirror-polished substrate 21, and, after drying, a spacer 22 is placed thereon. The stripping agent is used for easily stripping off a film 5b which will be described below, from the substrate 21. In the embodiment, a volatile solvent containing SEPARAKKU (produced by Yamaichi Kagaku Kogyosha) was used as the stripping agent. The substrate 21 may be made of any one of various materials including glass, ceramics, a metal, and a resin, as far as its surface can be formed as a mirror surface which can prevent the face of the film 5b from being roughened. In the embodiment, in consideration of the configuration of the filter element 5 which includes the substrate 21, glass, which is a transparent material, is used as the material of the substrate.

The spacer 22 is used for defining the thickness of the film 5b, to be formed, and may be configured by a tape, glass beads, or the like. In the embodiment, MICROPEARL SP-220 (produced by Sekisui Fine Chemical Co., Ltd.) which has a diameter of 20 μm and which is commercially available as a spacer for a liquid crystal cell was used as the spacer. The thickness of the spacer 22 is adequately selected so that the formed film 5b has a desired thickness (10 to 60 μm).

Preferably, the lower limit of the thickness of the film 5b is 10 μm and the higher limit is 60 μm. When the thickness is equal to or smaller than 10 μm, the number of repetitions of the helical pitch of liquid crystal molecules is insufficient, and the selective reflection characteristic is impaired. A thickness corresponding to 10 pitches is required at the minimum. When the reflection characteristic can be prevented from being impaired, however, the thickness may be equal to or smaller than 10 μm. By contrast, when the thickness exceeds 60 μM, the width of the groove 3 formed in the optical waveguide layer 2 must be increased. In this configuration, the insertion loss is increased.

The above discussion is applied to the case where only the film 5b is used as the filter element 5. When a stacked member including the substrate 21 is used as the filter element 5, the thickness of the stacked member is preferably set so as not to exceed 60 μm.

Next, a few drops of an ultraviolet curing nematic liquid crystal 5a to which a chiral agent is added at a predetermined mixture ratio are dropped onto the substrate 21. As the chiral agent, for example, useful are S-811, R-811, S1011, R-1011, and CN (all are products of Merck & Co., Inc.). As the ultraviolet curing nematic liquid crystal, useful are ULC-001, ULC-002 (all are products of Dainippon Ink and Chemicals, Inc.), etc. Depending on the structure of the used chiral agent, it is possible to select either of the right-handed rotatory and the left-handed rotatory. In accordance with the amount of addition, the selective reflection wavelength can be adjusted. In experiments of the embodiment, two kinds of samples which can attain a selective reflection wavelength of 1.55 μm, namely, ULC-0002 (right-handed rotatory, sample A) to which 7.4 wt. % of R-811 was added, and ULC-0002 (left-handed rotatory, sample B) to which 7.2 wt. % of S-811 was added were prepared.

Next, the liquid crystal 5a on the substrate 21 is pressed downward by a transparent substrate 23, to be formed into the film 5b (see FIG. 2(B)), and then irradiated with ultraviolet rays to be cured. Specifically, the ultraviolet curing nematic liquid crystal 5a to which the chiral agent is added is sandwiched through the spacer 22 between the pair of substrates 21 and 23, and irradiated with ultraviolet rays of a predetermined illuminance, thereby producing a film-like thin film filter.

The substrate 23 may be made of any one of various materials such as glass, and a film, as far as ultraviolet rays can be transmitted through the material. In this example, glass was used. The irradiation of ultraviolet rays was conducted for three minutes by using a mercury vapor lamp of 10 to 15 mW/cm².

Next, the cured film 5b is cut into a given size along the lines X and Y shown in FIG. 2(C), and then peeled off from the substrate 21 as shown in FIG. 2(D). It is a matter of course that the film may be cut together with the substrate 21 so that the combination of the film and the substrate may be used as a stacked member.

FIG. 3 shows the spectral transmittance characteristic of a film 5A (produced from the sample A, right-handed rotatory) which was produced by the process described above. As apparent from FIG. 3, a liquid crystal exhibiting a cholesteric phase basically acts only on single circularly polarized light, and hence reflects only about 50% of incident light. In order to attain a higher reflectance, a two-layer structure having the right-handed rotatory and the left-handed rotatory is formed, and the structure is used by being inserted into the groove 3 shown in FIG. 1.

Figure 4:
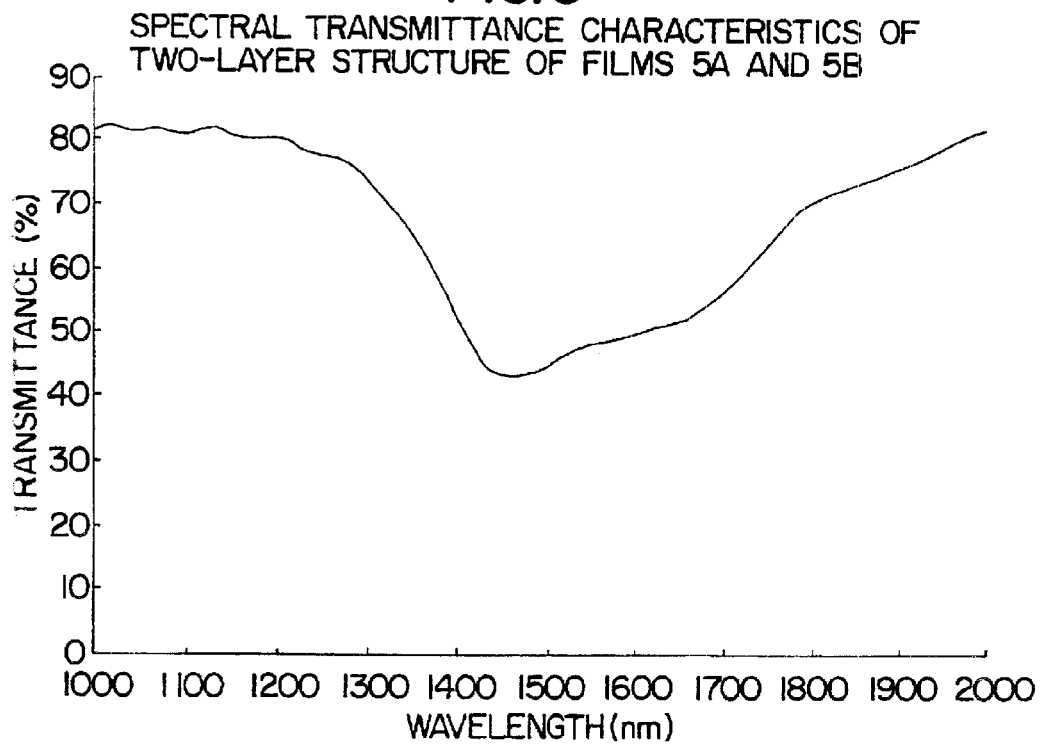
FIG. 4 is a graph showing the spectral transmittance characteristic of the filter element (two-layer)

FIG. 4 shows the spectral transmittance characteristic of a structure in which a film 5B (produced from the sample B, left-handed rotatory) is stacked on the film 5A. In order to further improve the characteristic, a four-layer structure (in which two sets of the films 5A and 5B respectively having the right-handed rotatory and the left-handed rotatory are stacked) is formed.

Figure 5:
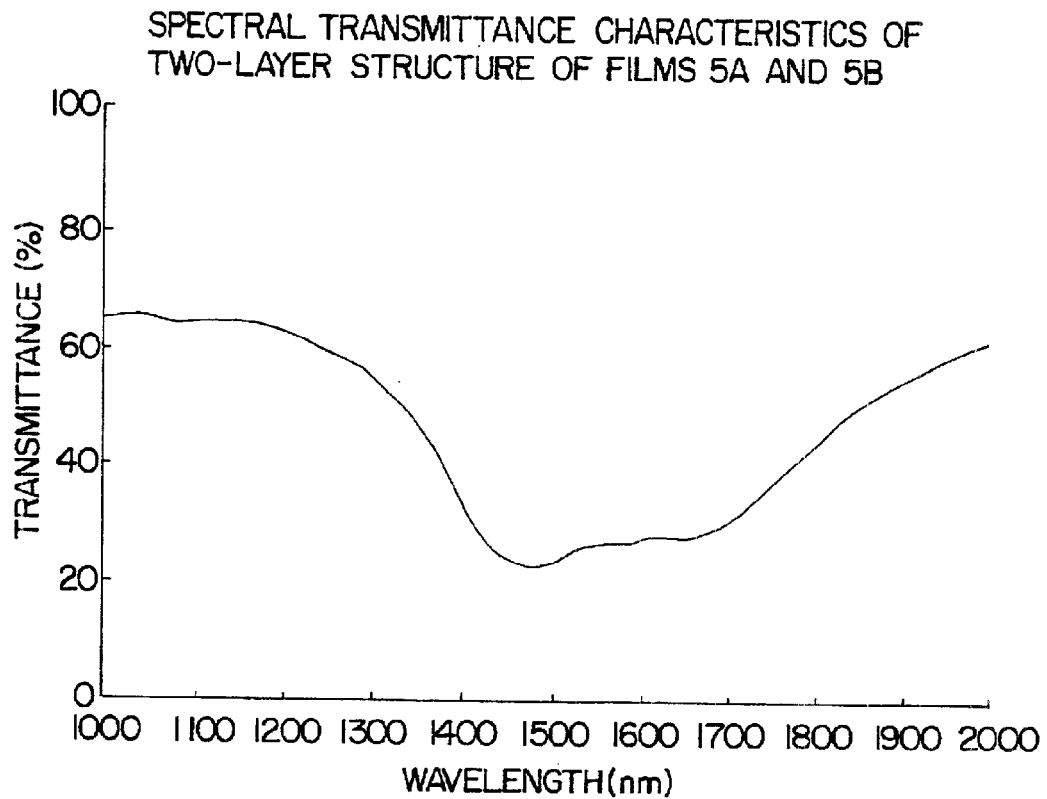
FIG. 5 is a graph showing the spectral transmittance characteristic of the filter element (four-layer)

FIG. 5 shows the spectral transmittance characteristic of the four-layer structure. The characteristics shown in FIGS. 3, 4, and 5 were measured while the glass substrate 21 was included in the structure.

FIGS. 2(A)–2(D) show the process of producing the single-layer film. A film of a two- or four-layer structure can be produced in the following manner. A liquid crystal which will be formed as an upper layer is added dropwise onto the film 5b which is obtained in the step of FIG. 2(C), in a direct manner or through a thin transparent film or the like. The liquid crystal is then gradually cured. Alternatively, another film 5b in the cured state may be stacked on the film.

When the films 5A and 5B are stacked on each other, the spectral transmittance characteristic is improved, but the production cost is increased. Therefore, the filter element 5 is provided with an optimum layered structure so as to attain a desired characteristic, while considering the whole characteristics which are determined by the characteristics of a light source and the photodiode 11, those of a signal processing circuit, and the like.

Second Embodiment

Figure 6:
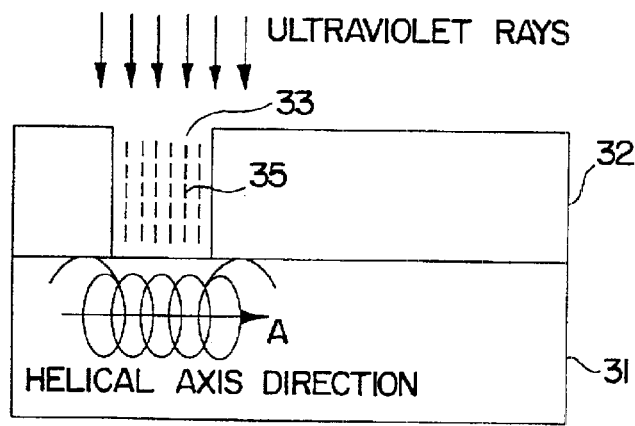
FIG. 6 is a diagram showing an optical filter device which is a second embodiment of the invention.

An optical filter device of a second embodiment is shown in FIG. 6.

FIG. 6 diagrammatically shows the optical filter device. An optical waveguide layer 32 made of quartz is stacked on a silicon substrate 31. A liquid crystal material before curing is directly poured into a groove 33 formed in the optical waveguide layer 32, and then irradiated with ultraviolet rays to be cured, thereby producing a filter element 35. The function and effects of the filter element 35 are identical with those of the above-described filter element 5 (the films 5A and 5B). The filter element may be configured by a single layer or plural layers.

In a liquid crystal exhibiting a cholesteric phase, liquid crystal molecules tend to be aligned in parallel when an orientation process is not particularly conducted. As shown in FIG. 6, therefore, the helical axis is oriented in parallel with the waveguide direction A of the optical waveguide layer 32, only by pouring the liquid crystal material into the groove 33. An orientation process may be conducted on the vertical faces of the groove 33.

Other Embodiments

The optical filter device of the invention is not restricted to the embodiments described above, and may be variously modified within the scope of the invention.

Particularly, it is a matter of course that various materials other than those described in the first embodiment may be used in the ultraviolet curing liquid crystal layer. The production process of the layer may be variously selected in accordance with the material. Furthermore, the materials of the substrate and the optical waveguide layer can be arbitrarily selected.

Further, normal cholesteric liquid crystal materials can be used, as mentioned above. However, the temperature dependence of cholesteric liquid crystals makes UV curable liquid crystal attractive since it is not necessary to manage temperature variations which might otherwise change the helical pitch of chiral pitch of the chiral-agent.

The present invention has been described by way of exemplary embodiments to which the invention is not limited. Variations and modifications in addition to those described herein will doubtless occur to those skilled in the art without departing from the spirit and scope of the present invention as recited in the claims appended hereto.

What is claimed is:

1. An optical filter device comprising:
    an optical waveguide layer; and
    a filter element including a liquid crystal layer disposed in a position which divides said optical waveguide layer in a waveguide direction, said liquid crystal layer having a twisted structure in which a helical pitch reflects light of a predetermined wavelength,
    wherein said filter element is formed by filling a liquid crystal material before curing into a groove which is formed in said optical waveguide layer, and then curing the liquid crystal material.

2. An optical filter device according to claim 1, wherein said liquid crystal layer is formed by stacking a clockwise polarized layer and a counterclockwise polarized layer.

3. An optical filter device according to claim 1, wherein said liquid crystal layer has a thickness of 10 to 60 $\mu$m.

* * * * *